March 28, 1967 V. D. BELL 3,311,249
VACUUM WARE
Filed Aug. 23, 1965
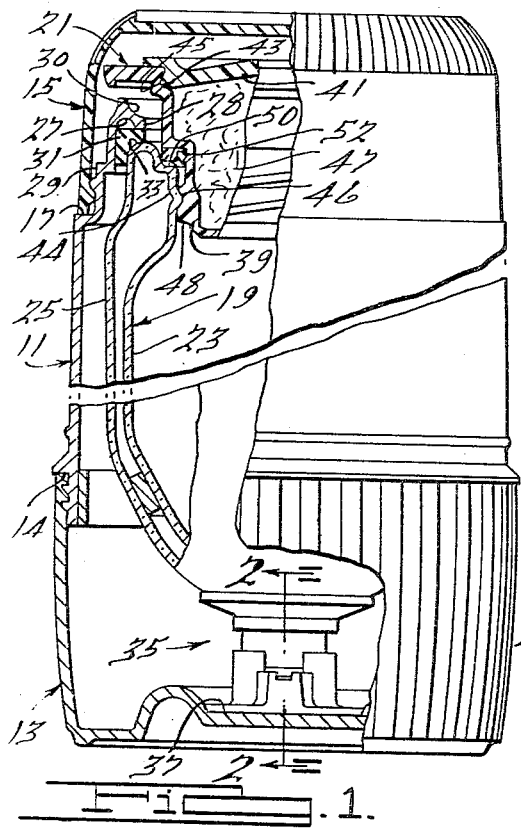
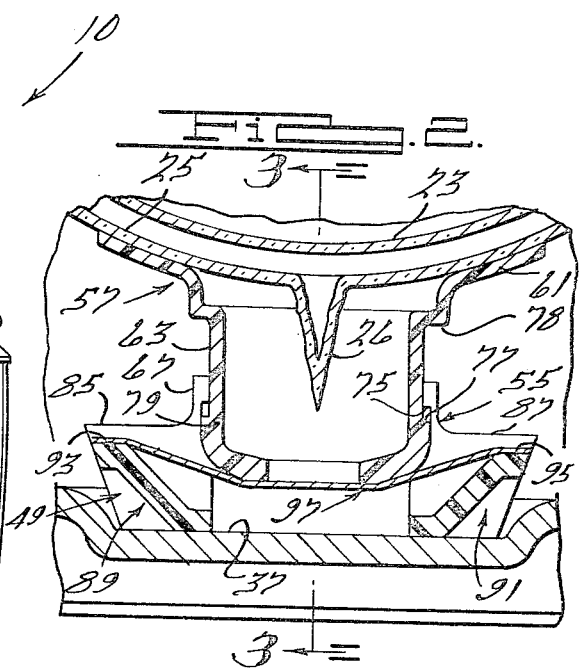
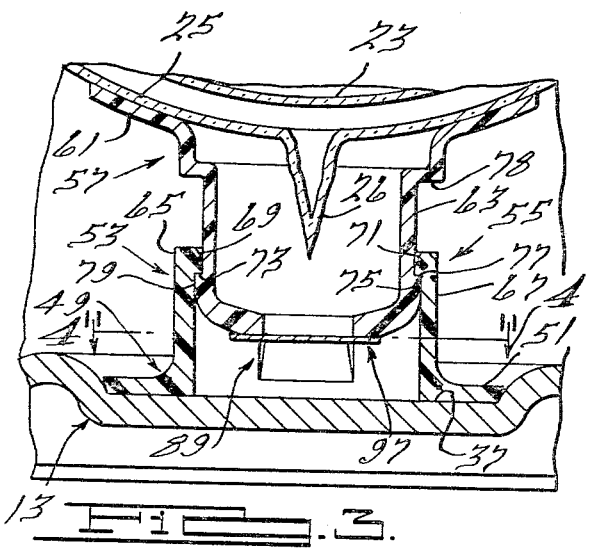
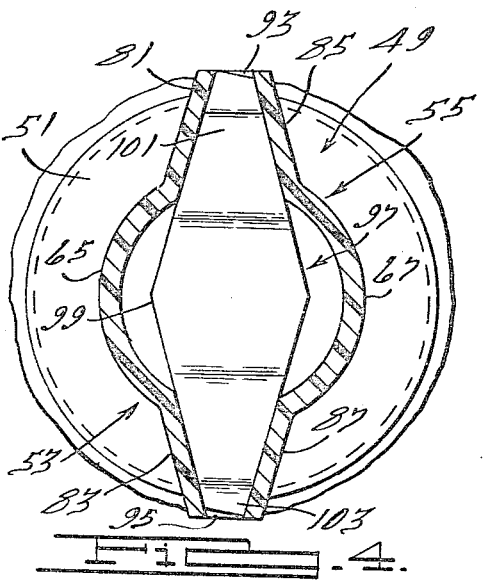
INVENTOR.
Vernon D. Bell
BY
Harness Dickey Pierce
ATTORNEYS

United States Patent Office 3,311,249
Patented Mar. 28, 1967

3,311,249
VACUUM WARE
Vernon D. Bell, Westerly, R.I., assignor to King-Seeley Thermos Co., Ann Arbor, Mich., a corporation of Michigan
Filed Aug. 23, 1965, Ser. No. 481,819
18 Claims. (Cl. 215—13)

This invention relates to vacuum ware and more particularly provides an improved vacuum bottle and an improved, somewhat resilient, shock absorber which protects the bottle filler and an integral tip formed thereon, and also resiliently holds the filler in its mounting.

Vacuum bottle assemblies of the type to which the present invention relates generally include a hollow filler resiliently secured within a generally cylindrical casing and having a removable stopper closing the end of the filler. The filler is generally of double-wall glass construction having the space between the walls silvered and evacuated to minimize heat transfer through the filler walls and maintain the bottle contents at a substantially constant temperature. A neck at one end of the filler defines an opening which receives the removable stopper.

Since the filler is fabricated of glass, the mounting for the filler within the casing must be such as to prevent the filler from shattering, should the vacuum bottle be dropped, struck with a sharp blow, etc. To achieve this end, vacuum fillers are conventionally secured within the casing by a resilient or shock-absorbing mounting. In addition, the glass filler has a glass extension or tip integral therewith and protruding from the bottom thereof formed incidental to filler fabrication. Thus, in addition to the filler body, this tip must be protected and kept from contact with the casing.

With the foregoing, as well as other considerations in view, principal objects of the present invention are to provide an improved vacuum bottle and an improved resilient mounting between the bottle casing and filler adapted to cushion the filler and prevent it from shattering under a sharp blow and wherein the shock-absorber encompasses and protects the filler tip and prevents it from contacting or striking the casing.

Further objects include a vacuum bottle incorporating shock-absorbing means of the above character adapted to firmly and floatingly secure the filler in place within the casing and which is relatively inexpensive to manufacture, rugged in construction and reliable in use.

Other objects and advantages of the present invention will become more apparent from a consideration of the following detailed description taken in conjunction with the drawings in which:

FIGURE 1 is an elevational view, partly in section, of a vacuum bottle embodying the present invention;

FIG. 2 is an enlarged sectional view of a portion of FIG. 1 taken along the line 2—2 thereof;

FIG. 3 is a sectional view of FIG. 2 taken along the line 3—3 thereof showing the position of the parts during assembly; and FIG. 4 is a sectional view of FIG. 3 taken along the line 4—4 thereof.

Broadly described, the present invention includes a shock absorber assembly constructed from a hard, relatively inflexible material wherein the component parts are slidably interconnected and are biased in one direction by a resilient member interposed therebetween and wherein one part is secured to the filler and encompasses the filler tip and .the other part seats against the filler container.

Referring now more specifically to the drawings, the illustrated vacuum bottle comprises a container 10 formed by a casing 11 having a lower enclosure 13 threadedly secured thereto and abutting a flange 14 at its lower end and a removable cover 15 threadedly secured thereto at its upper end so that the lower end of the cover 15 seats against an annular shoulder 17 on the casing 11. The casing 11, lower enclosure 13 and the cover 15 may be formed of any suitable substance such as, for example, thermosetting or thermoplastic materials, as shown, or metals or other materials.

A hollow filler 19, in which liquid or other contents may be stored, is disposed within the container 10 and has a removable stopper 21 closing the end thereof. The filler 19 is generally of double-wall glass construction having spaced inner and outer walls 23, 25, the space therebetween being silvered and evacuated. The bottom end of the filler 19 has a hollow tip 26 through which, in manufacture, evacuation of the wall space is effected, and which is sealed off when evacuation has been completed. The upper end of the filler 19 is positioned within a downwardly facing annular recess 27 formed by a flange 28 integral with a reduced cylindrical portion 29 of the casing 11. The upper surface of the flange 28 is molded to define an upwardly presenting annular pouring lip 30. A neck-rubber 31 is seated in the recess 27 and sealingly engages a rounded annular surface 33 at the extreme upper end of the filler 19 to cushion the upper end of the filler and center it relative to the casing 11. A shock-absorber 35, to which the present invention is directed and which is described in detail hereinafter, engages and supports the lower end of the filler 19 and seats within a cup-shaped depression 37 in the base of the lower enclosure 13.

The stopper 21, as illustrated, comprises an upwardly presenting cup-like body 39 and a cover 41, preferably formed from conventional, moldable, thermosetting or thermoplastic materials. The upper end of the body 39 has an annular seat 43 into which a shoulder 45 on the cover 41 is adapted to be snapped with the peripheral configuration of the body 39 and cover 41 in this region being substantially complementary to provide a snug fit. The stopper can, if desired, be filled with an insulating material 47 to improve its heat insulating properties and minimize heat transfer therethrough. The upper region of the inner wall 23 has a neck 44 formed with threads 46 mating with threads 48 on the stopper 21. A shoulder 50 on the inner wall 23 above the neck 44 is adapted to receive and seat a resilient seal 52 secured to the stopper body 39.

The shock absorber illustrated generally at 35, FIG. 1 and briefly described above is shown in detail in FIGS. 2-4. Thus, the shock-absorber is seen to include a base 49 having a bottom flange 51 seated in the lower enclosure depression 37 and a pair of upwardly extending side walls 53, 55 integral therewith. A cap 57 completely encases the tip 26 formed integral with the bottom of the filler 19. The cap 57 has a flange 61 contoured complementary to the bottom of the filler 19 and secured thereto using a suitable adhesive such as cement, resin or the like. A cylindrical, generally cup-shaped, body 63 depends from the flange 61 and is telescopically slidably disposed between the side walls 53, 55 of the base 49. Both the base 49 and the cap 57 are preferably formed from a relatively hard, inflexible material, the cap being so constructed to protect the tip 26 from being struck which otherwise would damage the tip 26 and destroy the vacuum between the walls 23, 25 and possibly cause the filler 19 to shatter. One substance which has been found particularly satisfactory for use here is a medium heat, high-to-medium impact polystyrene.

As shown, the upstanding side walls 53, 55 have generally arcuately shaped intermediate portions 65, 67, respectively, adapted to surround and slidably receive the cup-shaped body 63 of the cap 57. Each of the portions 65, 67 has at its upper end a radially inwardly directed flange 69, 71 forming downwardly facing shoulders 73, 75, respectively, positioned to abut an upwardly facing annular shoulder 77 on the cup-shaped body 63 formed by a radially outwardly extending annular flange 79. Engagement between these shoulders 75, 77 normally limits movement of the base 49 and cap 57 in a direction away from each other. Flanges 65, 67 freely slidably receive the cup-shaped body 63. Thus, the base 49 and the cap 57 are freely movable toward and away from each other except for the spring mentioned below and except as limited by the shoulders 75, 77 and by an annular shoulder 78 at the upper end of the body 63 engageable with the upper ends of the flanges 69, 71.

The base 49 is constructed to provide a seat for a spring 97 adapted to engage and bias the cap 57 in a direction away from the base. Thus, the upstanding side walls 53, 55 have end portions 81, 83 and 85, 87 integral with the mid-portions 65, 67, respectively, and with the bottom flange 51. An intervening web 89, 91 spans the area between the side wall end portions 81, 85 and 83, 87, respectively, and is integral therewith. The webs 89, 91 define upwardly facing seats 93, 95, respectively, at their outer ends upon which the ends of a relatively thin flat spring 97 seats. The spring 97 is constructed of a relatively stiff spring-like material such as, for example, spring steel. The spring 97 has a relatively wide mid-portion 99 and tapered ends 101, 103 which fit snugly between the side wall end portions 81, 85 and 83, 87 and engage the seats 93, 95, respectively. This configuration holds the spring 97 centered relative to the base 49.

As shown, the webs 89, 91 taper downwardly and inwardly from the spring seats 93, 95 and leave the spring 97 unsupported except at its ends 101, 103. As appears in FIGS. 2 and 3, the spring 97 is positioned to engage and support the lower end of the cup body 63 and bias it and filler 19 upwardly and thereby hold the filler upper end 33 securely engaged in the neck-rubber 31 as seen in FIG. 1. The spring 97 is, as described, unsupported except for its ends; it is free to flex downwardly, as viewed in FIGS. 2 and 3, thereby allowing the cap 57 and base 49 to move toward each other. Preferably, the parts are in the position illustrated in FIG. 2 when the vacuum bottle is fully assembled, i.e., the base 49 and the cap 57 are pushed toward each other by the lower enclosure 13 so that the flanges 69, 71 are between and spaced from the shoulders 77 and 78. The force of the spring 97 holds the filler 19 securely against the neck-rubber 31. In addition, the flat spring 97 exerts a substantially constant biasing force on the cap 57 throughout its flexure which allows the shock absorber to function substantially uniformly throughout a variety of relative positions of the parts. This is advantageous in that it automatically compensates for modest variations in length of the filler 19, which normally occur in manufacturing. Furthermore, should the vacuum bottle be dropped or otherwise be struck by a sharp blow, the filler 19 tends to move upwardly or downwardly relative to the casing 11 and the lower enclosure 13. The resilient nature of the spring 97 allows some upward or downward movement of the cap 57 relative to the base 49 and therefore similar movement of the filler 19 relative to the lower enclosure 13 and cushions the impact. The resilient nature of the neck-rubber 31 permits slight upward movement of the filler 19 relative to the casing 11 as the spring 97 tends to strengthen out to help cushion sharp blows against the top of the vacuum bottle. When the filler 19 moves downwardly within the container, the neck-rubber 31 expands and the spring 97 flexes downwardly at its mid-portion 99. Thus, the filler 19 is securely held during floating movement within the container while being cushioned against shock.

The inner edges of the flanges 69, 71 are tapered to form cam surfaces. This enables cap 57 to be inserted into base 49 with a snap action, during which flange 79 forces the side walls 53, 55 outwardly as the flanges 69, 71 engage and move past the radial flange 79 on the cup body 63. Thereafter, the shock absorber 35 is adhered to the base of the filler 19 and the filler positioned with its upper end 33 engaging the neck-rubber 31 after it is placed in the recess 27. The lower enclosure 13 is then threaded on the casing 11 until the bottom flange 51 engages in the depression 37. This is the position of the parts as shown in FIG. 3. Continued threading action of the lower enclosure 13 on the casing 11 then moves the base 49 toward the cap 57 by flexing the spring 97 and insures proper seating of the filler upper surface 33 against the neck-rubber 31. When the upper end of the lower enclosure 13 seats against the flange 14 on the casing 11, the shoulders 75, 77 on the base 49 and cap 57, respectively, are spaced from each other and the top edge of the flanges 69, 71 spaced from the shoulder 78. See FIG. 2. In this manner, the filler 19 is in complete suspension and subject to the spring 97 may have a limited shock-absorbing movement within the casing. Should it be desired to replace the filler 19, the lower enclosure is unthreaded from the casing 11 after which the filler is easily removed.

By the present invention then, there has been provided an improved vacuum bottle and an improved combination tip protector and shock-absorber assembly and while a preferred embodiment has been illustrated and described above, various additions, substitutions, modifications and omissions may be made thereto without departing from the spirit of the invention as encompassed by the appended claims.

What is claimed is:

1. In vacuum ware, a casing having a fragile filler disposed therein, resilient means disposed between said casing and said filler adjacent one end thereof, shock-absorber means interposed between said casing and said filler at the other end thereof, said shock-absorber means including first and second relatively stiff portions slidably engageable for movement toward and away from each other, a flat elongated spring seated at its ends upon one portion and engaging the other portion at its middle, whereby said filler is resiliently supported within said casing and is cushioned by said spring for movement longitudinally of said casing.

2. In vacuum ware, a casing having a fragile filler disposed therein, resilient means disposed between said casing and said filler adjacent one end thereof, shock-absorber means interposed between said casing and said filler at the other end thereof, said shock-absorber means including first and second relatively stiff portions, said first portion secured to said filler other end and encompassing a tip formed thereon, said second portion engaging said casing and slidably engaging said first portion for movement toward and away from each other, spaced abutment means formed on said first portion and cooperable with abutment means on said second portion to limit relative sliding movement therebetween, a flat elongated spring seated at its ends upon one portion and engaging the other portion at its middle, whereby said filler is resiliently supported within said casing and is cushioned by said spring for movement longitudinally of said casing.

3. In vacuum ware, a casing having a fragile filler disposed therein, resilient means disposed between said casing and said filler adjacent one end thereof, shock-absorber means interposed between said casing and said filler at the other end thereof, said shock-absorber means including first and second relatively stiff portions, said first portion secured to said filler other end and encompassing a tip formed thereon, said second portion engaging said casing and slidably engaging said first portion for movement toward and away from each other, spaced annular shoulders formed on said first portion and cooperable with flange means on said second portion to limit relative sliding movement therebetween, a flat, elongated spring seated at its ends upon one portion and engaging the other portion at its middle, whereby said filler is resiliently supported within said casing and is cushioned by said spring for movement longitudinally of said casing.

4. In vacuum ware, a casing having a fragile filler disposed therein, resilient means disposed between said casing and said filler adjacent one end thereof, shock-absorber means interposed between said casing and said filler at the other end thereof, said shock-absorber means including first and second relatively stiff portions, said first portion secured to said filler other end and encompassing a tip formed thereon, said second portion engaging said casing and having arcuate sleeve portions slidably engaging said first portion for movement toward and away from each other, spaced annular shoulders formed on said first portion and cooperable with flange means on each sleeve portion of said second portion to limit relative sliding movement therebetween, a flat, elongated spring seated at its ends upon one portion and engaging the other portion at its middle, whereby said filler is resiliently supported within said casing and is cushioned by said spring for movement longitudinally of said casing, each of said flange means having a cam surface thereon permitting assembly of said first and second portions.

5. A shock absorber mechanism for use in vacuum ware or the like, comprising a casing and fragile filler contained therein, said shock-absorber mechanism including first and second relatively stiff portions slidably engageable for movement toward and away from each other, a flat elongated spring seated at its ends upon one portion and engaging the other portion at its middle, whereby said filler is resiliently supported within said casing and is cushioned by said spring for movement longitudinally of said casing.

6. A shock absorber mechanism for use in vacuum ware or the like, comprising a casing and a fragile filler contained therein, said shock-absorber mechanism including first and second relatively stiff portions, said first portion secured to one end of said filler and encompassing a tip formed thereon, said second portion engaging said casing and slidably engaging said first portion for movement toward and away from each other, spaced abutment means formed on said first portion and cooperable with abutment means on said second portion to limit relative sliding movement therebetween, a flat elongated spring seated at its ends upon one portion and engaging the other portion at its middle, whereby said filler is resiliently supported within said casing and is cushioned by said spring for movement longitudinally of said casing.

7. A shock absorber mechanism for use in vacuum ware or the like, comprising a casing and a fragile filler contained therein, said shock-absorber mechanism including first and second relatively stiff portions, said first portion secured to one end of said filler and encompassing a tip formed thereon, said second portion engaging said casing and slidably engaging said first portion for movement toward and away from each other, spaced annular shoulders formed on said first portion and cooperable with flange means on said second portion to limit relative sliding movement therebetween, a flat, elongated spring seated at its ends upon one portion and engaging the other portion at its middle, whereby said filler is resiliently supported within said casing and is cushioned by said spring for movement longitudinally of said casing.

8. A shock absorber mechanism for use in vacuum ware or the like, comprising a casing and a fragile filler contained therein, said shock-absorber mechanism including first and second relatively stiff portions, said first portion secured to one end of said filler and encompassing a tip formed thereon, said second portion engaging said casing and having arcuate sleeve portions slidably engaging said first portion for movement toward and away from each other, spaced annular shoulders formed on said first portion and cooperable with flange means on each sleeve portion of said second portion to limit relative sliding movement therebetween, a flat, elongated spring seated at its ends upon one portion and engaging the other portion at its middle, whereby said filler is resiliently supported within said casing and is cushioned by said spring for movement longitudinally of said casing, each of said flange means having a cam surface thereon permitting assembly of said first and second portions.

9. In vacuum ware, a casing having a fragile filler disposed therein, resilient means disposed between said casing and said filler adjacent one end thereof, shock-absorber means interposed between said casing and said filler at the other end thereof, said shock-absorber means including first and second telescoping portions, each having a pair of radially spaced surfaces at adjacent circumferences thereof, said radially spaced surfaces on one of said portions cooperating slidably with the radially spaced surfaces on the other of said portions, a stop surface interconnecting the radially spaced surfaces on each said portion and cooperable to limit relative movement between said portions in one direction, said first portion secured to one end of said filler other end, said second portion engaging said casing, resilient means normally biasing said first and second portions in said one direction relative to each other and said filler toward said first-mentioned resilient means.

10. In vacuum ware, a casing having a fragile filler disposed therein, resilient means disposed between said casing and said filler adjacent one end thereof, shock-absorber means interposed between said casing and said filler at the other end thereof, said shock-absorber means including a first portion secured to said filler other end, a second portion receiving said first portion and engaging said casing, said first and second portions having slidably disposed surfaces at the outer and inner circumference thereof, respectively, cooperable stop means on said first and second portions and without said first portion limiting the relative sliding movement of said portions in one direction, resilient means normally biasing said first and second portions in said one direction relative to each other and said filler toward said first-mentioned resilient means, said first and second portions being movable in a second direction relative to each other opposite to said first direction.

11. In vacuum ware, a casing having a fragile filler disposed therein, resilient means disposed between said casing and said filler adjacent one end thereof, shock-absorber means interposed between a removable end of said casing and said filler at the other end thereof, said shock-absorber means including first and second telescoping portions, each having a pair of radially spaced surfaces at adjacent circumferences thereof, said radially spaced surfaces on one of said portions cooperating slidably with the radially spaced surfaces on the other of said portions, a stop surface interconnecting the radially spaced surfaces on each said portion and cooperable to limit relative movement between said portions in one direction, said first portion secured to one end of said filler other end, said second portion engaging said casing, resilient means normally biasing said first and second portions in said one direction relative to each other and said filler toward said first-mentioned resilient means, said cooperable stop surfaces being normally spaced when said casing and filler are assembled, whereby to resiliently support said filler within said casing and permit cushioned relative longitudinal movement between said filler and casing.

12. In vacuum ware, a casing having a fragile filler disposed therein, resilient means disposed between said casing and said filler adjacent one end thereof, shock-absorber means interposed between said casing and said filler at the other end thereof, said shock-absorber means including first and second telescoping portions, each having a pair of radially spaced surfaces at adjacent circumferences thereof, said radially spaced surfaces on one of said portions cooperating slidably with the radially spaced surfaces on the other of said portions, a stop surface interconnecting the radially spaced surfaces on each said portion and cooperable to limit relative movement between said portions in one direction, said first portion secured to said filler other end, said second portion engaging said casing, resilient means normally biasing said first and second portions in said one direction relative to each other and said filler toward said first-mentioned resilient means, said cooperable stop surfaces being normally spaced when said casing and filler are assembled, whereby to resiliently support said filler within said casing and permit cushioned relative longitudinal movement between said filler and casing.

13. In vacuum ware, a casing having a fragile filler disposed therein, resilient means disposed between said casing and said filler adjacent one end thereof, shock-absorber means interposed between said casing and said filler at the other end thereof, said shock-absorber means including disengageable first and second telescoping portions, each having a pair of radially spaced surfaces at adjacent circumferences thereof, said radially spaced surfaces on one of said portions cooperating slidably with the radially spaced surfaces on the other of said portions, a stop surface interconnecting the radially spaced surfaces on each said portion and cooperable to limit relative movement between said portions in one direction, said first portion secured to said filler other end, said second portion engaging said casing, spring means normally biasing said first and second portions in said one direction relative to each other and said filler toward said resilient means.

14. A shock absorber mechanism for use in vacuum ware or the like, comprising a casing and a fragile filler contained therein, said shock absorber mechanism including first and second telescoping portions, each having a pair of radially spaced surfaces at adjacent circumferences thereof, said radially spaced surfaces on one of said portions cooperating slidably with the radially spaced surfaces on the other of said portions, a stop surface interconnecting the radially spaced surfaces on each said portion and cooperable to limit relative movement between said portions in one direction, said first portion secured to one end of said filler, said second portion engaging said casing, resilient means normally biasing said first and second portions in said one direction relative to each other, said first and second portions being movable in a second direction relative to each other opposite said first direction.

15. A shock absorber mechanism for use in vacuum ware or the like, comprising a casing and a fragile filler contained therein, said shock absorber mechanism including a first portion adapted to be secured to one end of said filler, a second portion receiving said first portion and adapted to engage said casing, said first and second portions having slidably disposed surfaces at the outer and inner circumference thereof, respectively, cooperable stop means on said first and second portions and without said first portion limiting the relative sliding movement of said portions in one direction, resilient means normally biasing said first and second portions in said one direction relative to each other, said first and second portions being movable in a second direction relative to each other opposite to said first direction.

16. A shock absorber mechanism for use in vacuum ware or the like, comprising a casing and a fragile filler container therein, said shock absorber mechanism including first and second telescoping portions, each having a pair of radially spaced surfaces at adjacent circumferences thereof, said radially spaced surfaces on one of said portions cooperating slidably with the radially spaced surfaces on the other of said portions, a stop surface interconnecting the radially spaced surfaces on each said portion and cooperable to limit relative movement between said portions in one direction, said first portion secured to one end of said filler, said second portion engaging said casing, resilient means normally biasing said first and second portions in said one direction relative to each other, said cooperable stop surfaces being normally spaced when said casing and filler are assembled, whereby to resiliently support said filler within said casing and permit cushioned relative longitudinal movement between said filler and casing.

17. A shock absorber mechanism for use in vacuum ware or the like, comprising a casing and a fragile filler contained therein, said shock absorber mechanism including first and second telescoping portions, each having a pair of radially spaced surfaces at adjacent circumferences thereof, said radially spaced surfaces on one of said portions cooperating slidably with the radially spaced surfaces on the other of said portions, a stop surface interconnecting the radially spaced surfaces on each said portion and cooperable to limit relative movement between said portions in one direction, said first portion secured to one end of said filler, said second portion engaging said casing, resilient means normally biasing said first and second portions in said one direction relative to each other, said cooperable stop surfaces being normally spaced when said casing and filler are assembled, whereby to resiliently support said filler within said casing and permit cushioned relative longitudinal movement between said filler and casing.

18. A shock absorber mechanism for use in vacuum ware or the like, comprising a casing and a fragile filler contained therein, said shock absorber mechanism including disengageable first and second telescoping portions, each having a pair of radially spaced surfaces at adjacent circumferences thereof, said radially spaced surfaces on one of said portions cooperating slidably with the radially spaced surfaces on the other of said portions, a stop surface interconnecting the radially spaced surfaces on each said portion and cooperable to limit relative movement between said portions in one direction, said first portion secured to one end of said filler, said second portion engaging said casing, spring means normally biasing said first and second portions in said one direction relative to each other, said first and second portions being movable in a second direction relative to each other opposite said first direction.

References Cited by the Examiner

UNITED STATES PATENTS

| | | | |
|---|---|---|---|
| 1,319,949 | 10/1919 | Curran et al. | |
| 2,591,151 | 4/1952 | Hansen et al. | 220—15 X |
| 3,047,175 | 7/1962 | Bramming | 215—13 |
| 3,076,575 | 2/1963 | Lislie-Smith | 215—13 |
| 3,163,307 | 12/1964 | Bramming | 215—13 |
| 3,193,126 | 7/1965 | Bramming | 215—13 |

FOREIGN PATENTS 26,897  12/1908  Great Britain.

JOSEPH R. LECLAIR, *Primary Examiner.*

D. F. NORTON, *Assistant Examiner.*